June 23, 1942. O. DUDA 2,287,343

METHOD OF SECURING DEVICES TO SHAFTS

Filed April 8, 1938

Inventor
Oswald Duda
Jesse R. Stone
Lester B Clark
Attorneys

Patented June 23, 1942

2,287,343

UNITED STATES PATENT OFFICE 2,287,343

METHOD OF SECURING DEVICES TO SHAFTS

Oswald Duda, Corsicana, Tex., assignor to American Well & Prospecting Company, a corporation Application April 8, 1938, Serial No. 200,974

1 Claim. (Cl. 29—159.3)

The invention relates to sprocket wheels, drum heads and the like and pertains particularly to the method of mounting such devices in position fixed upon the shaft.

The usual method of securing the hub of a sprocket wheel or the like upon a shaft includes boring the hub of the wheel slightly larger than the shaft, sliding the hub over the shaft to the desired position and then fixing the wheel in position by means of a tapered key driven within opposed keyways in the shaft and hub. This is generally unsatisfactory because the key will rarely remain tight and when it does stay tight the wheel rusts upon the shaft so that it is hard to remove.

It is an object of the method of this invention to so construct the hub of the wheel or drum head that it may be expanded to fit upon the shaft and after it is in proper position to then tighten the hub upon the shaft and key so that it will be fixed rigidly and yet be capable of expansion for removal without difficulty.

I aim to provide a method in which a hub may be expanded and bored to an internal diameter slightly greater than the outer diameter of the shaft so that it can be easily moved along the shaft to proper position and then released to fit the shaft tightly.

I have as another object the provision of a method using simple and easily operated means of expanding the hub temporarily, said means also acting as a means of tightening the hub upon the shaft when said hub has been positioned thereon.

Referring to the drawing herewith,

My invention is applicable to devices which have to be secured rigidly upon a shaft. Such device includes sprocket wheels, drum heads, clutches, and the like, and in the present disclosure I have illustrated it as applied to sprocket wheels and drum heads.

Figure 1:
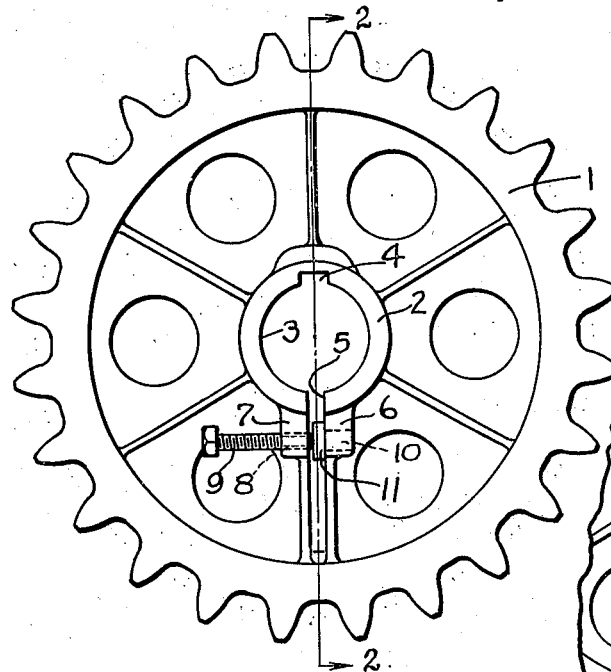
Fig. 1 is an end view of a sprocket wheel having a hub thereon formed in accordance with my invention.
Figure 2:
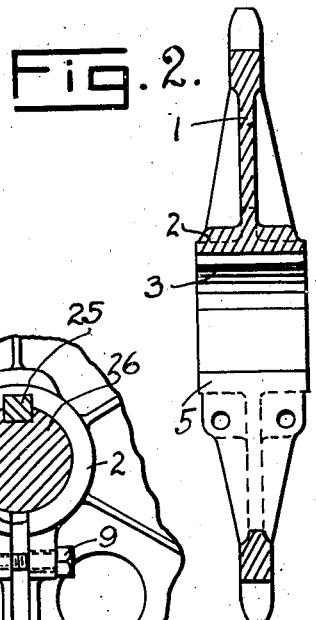
Fig. 2 is a vertical section thereof on the plane 2—2 of Fig. 1.
Figure 3:
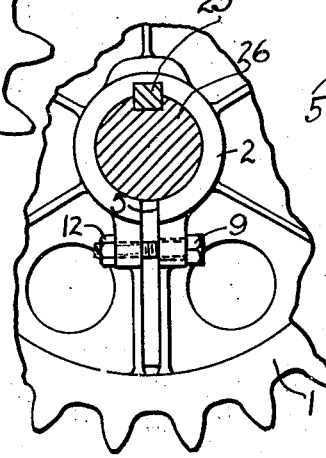
Fig. 3 is a broken view of the split portion of the hub showing the hub tightened in position on the shaft.

In Figs. 1 to 3, inclusive, I have shown a sprocket wheel 1, having a hub 2 thereon, the diameter of the interior 3 of which is originally less than the external diameter of the shaft. In order that the hub be mounted on the shaft, I arrange to expand the hub so that it may be fitted over the shaft. On one side of the hub is formed a keyway 4, which is adapted to cooperate with a key 25 upon the shaft 26. On one side of the hub, preferably on the side opposite the keyway 4, I split the hub at 5 and provide a space at the point where the hub is divided sufficiently to allow lateral play in both directions.

Adjacent the split 5 I form laterally projecting ears 6 and 7 on the hub, one on each side of the division in the hub. The ear 7 is formed with a threaded opening 8 therein to receive a threaded bolt 9. The opposite ear is formed with an opening 10 therein, which is unthreaded. I form a plate 11 of steel or hard material which can be inserted into the split portion 5 and engage over the opening 10, so that when the bolt 9 is screwed inwardly it will engage against the removable plate 11. Screwing the bolt up tightly the hub will spread apart several thousandths of an inch so as to slightly enlarge the central bore 3 of the hub.

I then bore the interior 3 of the hub to a size about .002 of an inch oversize, so that it may engage the shaft loosely.

With the hub expanded outwardly it may be slid freely over the shaft, the keyway 4 engaging over the key 25 in the shaft. When the proper position upon the shaft has been reached the bolt 9 can be unscrewed to release the plate 11 and when the bolt has been thus unscrewed the hub will automatically contract to its normal size, thus contacting with the shaft tightly so that it may not be moved. With the plate 11 removed the bolt 9 can be unscrewed and reversed and then inserted through the opening 10. It is then again screwed into the opening 8 and the bolt when tightened will clamp the two ears together, as shown in Fig. 3. The nut 12 may be screwed upon the end of the bolt to lock it against unscrewing.

As will be noted this is a very simple operation. The bolt 9, when in the position shown in Fig. 1, will not interfere with the operation of fitting the sprocket wheel over the shaft and into proper position, and when this position is reached it is a very simple operation to unscrew the bolt sufficiently to release the plate 11 and then to further tighten the hub into position. When thus fixed it is so firmly set upon the shaft that there is no chance of vibration or movement of the sprocket wheel upon the shaft.

However, when it becomes desirable to remove the sprocket wheel the nut may be unscrewed from the bolt and the bolt again used in conjunction with the plate 11 to expand the hub and when thus expanded the hub may be easily removed from the shaft.

Figure 4:
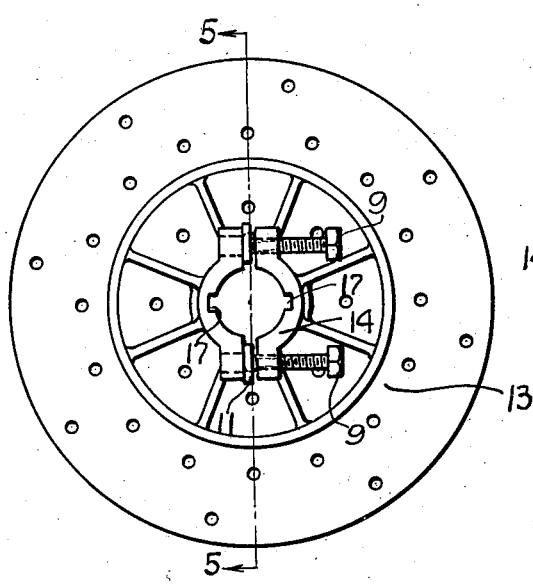
Fig. 4 is an end view of a drum head having a hub formed in accordance with my invention.
Figure 5:
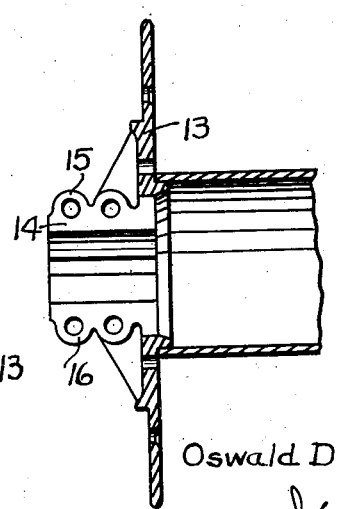
Fig. 5 is a vertical section on the plane 5—5 of Fig. 4.

In Figs. 4 and 5 I have illustrated the invention as applied to the hub of a drum head 13. The drum head 13 is provided with a hub 14 which is split on opposite sides and on each side of the split portion is formed ears 15 and 16, and it will be understood that one of the opposing ears on each side is threaded while the other is not, in the same manner as was described relative to the sprocket wheel. The drum head has its hub split on opposite sides because of the heavier construction of both the hub and the drum head.

In the operation of mounting this hub upon the shaft the bolts 9 upon each side are screwed against the plates 11 in the same manner as has been described, thus spreading the hub. The hub is then bored slightly oversize relative to the outer diameter of the shaft, so that it may be engaged over the shaft and when in proper position the hub may be released to engage the shaft tightly and it may then be clamped in place by the use of the bolts and nuts.

It will be noted that in connection with the hub 14 of the drum head there are two opposing keyways 17, which when the hub has been contracted serve to prevent relative rotation of the hub upon the shaft after said hub has been clamped rigidly thereto.

The operation of clamping the hub of the drum head upon the shaft is the same as has been described relative to the sprocket wheel. In prior practices it has been necessary without spreading to bore the opening through the hub of a diameter slightly larger than the shaft and to secure it in position upon the shaft by set screws. This has not been entirely satisfactory and the present method overcomes the difficulties which have been previously experienced and make the mounting of the drum upon the shaft a very simple operation. The advantages of this construction will be obvious to those skilled in the art.

What is claimed is:

A method of fitting fastening and releasing sprocket wheel and the like hubs upon shafts which comprises providing a hub having a split therein with an extending ear at each side of the split, threading a member into one ear and against the other ear to spread the ears and expand the hub within the elastic limit of the material, boring the hub to a size but slightly greater than the diameter of the shaft while the hub is thus expanded, positioning the hub upon the shaft, removing or releasing the member so as to allow the ears and hub to contract so that the hub is firmly seated on the shaft due to its inherent resiliency, and compressing the ears toward each other to secure the hub to the shaft with little or no stress in the metal of the hub.

OSWALD DUDA.